US008131640B2

(12) United States Patent
Seifert et al.

(10) Patent No.: US 8,131,640 B2
(45) Date of Patent: *Mar. 6, 2012

(54) METHOD FOR RECEIVING ELECTRONICALLY TRANSFERRED FUNDS USING AN AUTOMATED TELLER MACHINE

(75) Inventors: Dean A. Seifert, Parker, CO (US);
Earney E. Stoutenburg, Parker, CO (US)

(73) Assignee: The Western Union Company, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/566,220

(22) Filed: Sep. 24, 2009

(65) Prior Publication Data

US 2010/0070418 A1   Mar. 18, 2010

Related U.S. Application Data

(63) Continuation of application No. 10/037,827, filed on Jan. 3, 2002, now Pat. No. 7,617,157.

(51) Int. Cl.
*G06Q 40/00*   (2012.01)

(52) U.S. Cl. .......................................................... 705/39
(58) Field of Classification Search .................. None
See application file for complete search history.

(56) References Cited

U.S. PATENT DOCUMENTS 5,650,604 A * 7/1997 Marcous et al. .............. 235/379

* cited by examiner

*Primary Examiner* — Jason M Borlinghaus
(74) *Attorney, Agent, or Firm* — Sutherland Asbill & Brennan LLP

(57) ABSTRACT

A method for performing a money transfer receive transaction involving a desired amount of money to be transferred from a sender to a recipient includes receiving transaction identifying information provided by the recipient; comparing the transaction identifying information with transaction data stored on a host computer system; providing a confirmation code, to be issued to the recipient, if the transaction identifying information matches the transaction data stored on the host computer system; storing the confirmation code on the host computer system; receiving at the host computer system input corresponding to the confirmation code from a dispensing terminal in communication with the host computer system; comparing the input to the stored confirmation code; and allowing funds, corresponding to at least a portion of the desired amount of money, to be dispensed by the dispensing terminal if the input matches the stored confirmation code.

25 Claims, 3 Drawing Sheets

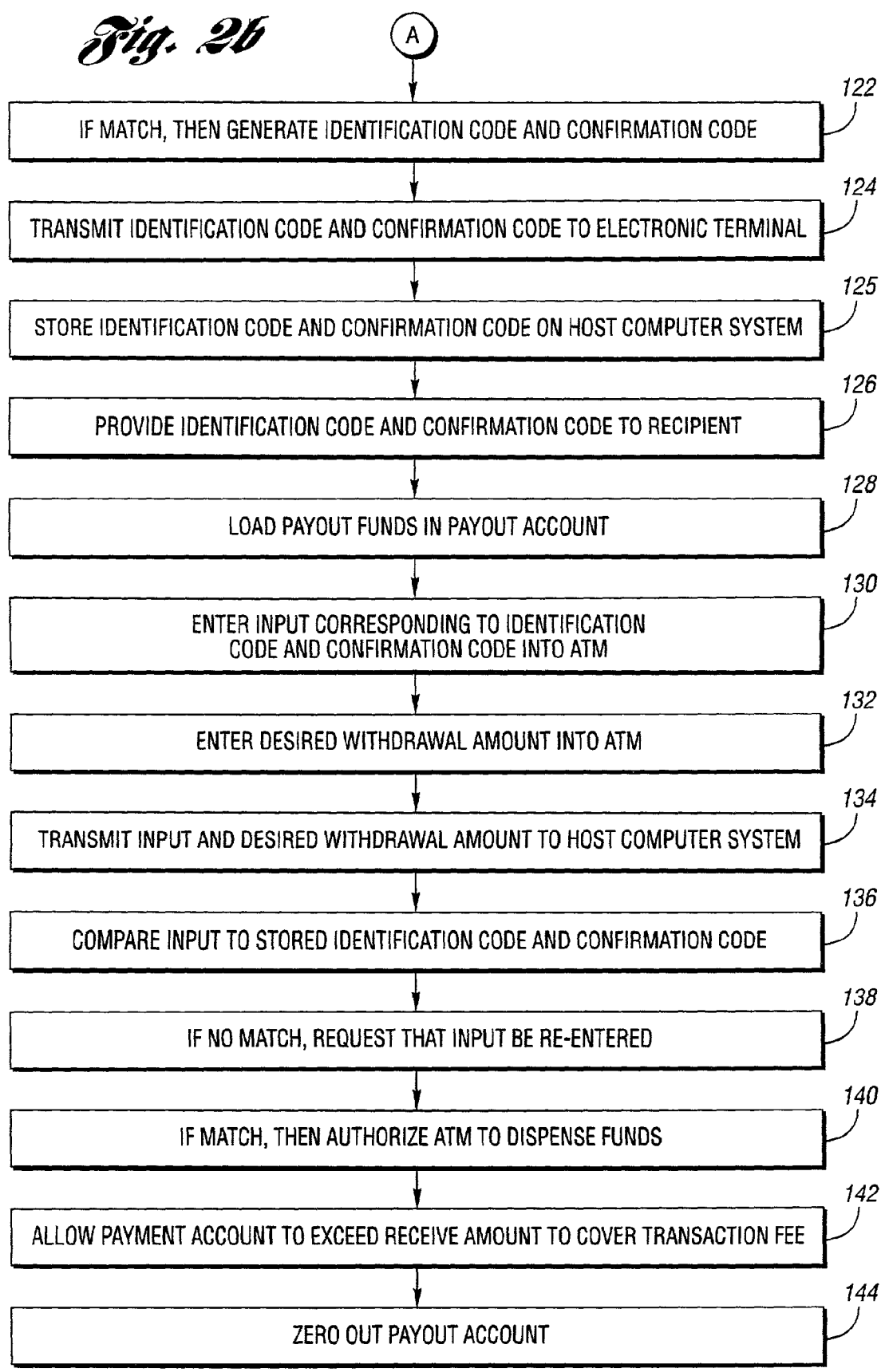

METHOD FOR RECEIVING ELECTRONICALLY TRANSFERRED FUNDS USING AN AUTOMATED TELLER MACHINE

CROSS-REFERENCE TO RELATED APPLICATIONS

This application is a continuation of and claims the benefit to U.S. Nonprovisional application Ser. No. 10/037,827, entitled "Method for Receiving Electronically Transferred Funds Using an Automated Teller Machine," filed Jan. 3, 2002, the entire contents of which are hereby expressly incorporated by this reference.

BACKGROUND OF THE INVENTION

1. Field of the Invention

The invention relates to a method of performing money transfer receive transactions.

2. Background Art

A money transfer transaction performed with a financial services institution may include a money transfer send transaction, or send transaction, and a money transfer receive transaction, or receive transaction. Under a send transaction, a sender sends or "wires" money to a recipient through the financial services institution. Under a receive transaction, the recipient receives money through the financial services institution. Many such transactions are also facilitated by businesses, organizations or other entities that act as agents of the financial services institution.

Various methods are known for performing send transactions. One known method, for example, involves a sender completing a transaction form and providing the form to an agent. The transaction form includes such information as the desired amount of money to be sent, sender information, and recipient information. The agent then enters the information from the transaction form into a computer, such as a point of sale terminal, that is in communication with a central data base or host computer of the financial services institution. Alternatively, the agent may communicate the information to a representative of the financial services institution, and the representative may provide additional information to the agent that is added to the transaction form. Next, the agent collects from the sender the desired amount of money to be sent plus any applicable fees and/or taxes.

Another method of performing a send transaction involves providing a telephone at an agent location with which a sender can access an operator of a financial services institution. The sender then provides information to the operator, such as recipient name, sender name, desired amount of money to be sent, and agent location. Next, the operator transmits a transaction form, which includes the information provided by the sender, to an agent at the agent location via a facsimile transmittal machine. The sender then signs the transaction form. Next, the agent collects from the sender the desired amount of money to be sent plus any applicable fees and/or taxes. The agent then signs the transaction form and transmits the form back to the operator. Next, the operator enters the information from the transaction form into a central data base of the financial services institution.

Still another method of performing a send transaction includes providing a sender an access card that is used to access a central data base of a financial services institution. The sender provides the access card to an agent, and the agent enters the access card into the terminal so as to retrieve from the data base a list of potential recipient names previously identified by the sender. After the list has been retrieved, the sender selects a desired recipient from the list, and provides a desired amount of money to be sent to the selected recipient. Next, the agent collects from the sender the desired amount of money to be sent plus any applicable fees and/or taxes.

A prior method of performing a receive transaction involves a sender providing a recipient a money transfer control number (MTCN), which represents a unique key to transaction information or data stored in the data base. The recipient may then enter the MTCN on a form, which is provided to an agent by the recipient. Next, the agent accesses the data base using a terminal, and obtains a receive amount that corresponds to the MTCN. Alternatively, the agent may obtain the receive amount, or other information related to the receive transaction, by entering the recipient's name, sender's name, or sender's telephone number into the terminal.

The agent may then print a check for the receive amount. Next, the check is provided to the recipient. The recipient then endorses the check and receives cash from the agent. The agent may then use the signed check to obtain reimbursement from the financial services institution.

If the receive amount exceeds the agent's payout limit, which is the amount the agent is authorized or willing to pay out in cash to the recipient, then the agent may issue multiple checks, such as one check for an amount up to the payout limit, and one or more additional checks for the remainder of the receive amount. The additional check or checks must then be taken elsewhere for encashment.

Because this method of performing a receive transaction requires the agent to have significant cash on hand, this method is not practical for agents that typically do not have significant cash available. As a result, the number of agent locations available to a recipient is limited.

SUMMARY OF THE INVENTION

A method, according to the invention, for performing a money transfer receive transaction involving a desired amount of money to be transferred from a sender to a recipient includes receiving transaction identifying information provided by the recipient; comparing the transaction identifying information with transaction data stored on a host computer system; providing a confirmation code, to be issued to the recipient, if the transaction identifying information matches the transaction data stored on the host computer system; storing the confirmation code on the host computer system; receiving at the host computer system input corresponding to the confirmation code from a dispensing terminal in communication with the host computer system; comparing the input to the confirmation code stored on the host computer system; and allowing funds, corresponding to at least a portion of the desired amount of money, to be dispensed by the dispensing terminal if the input matches the confirmation code stored on the host computer system.

DETAILED DESCRIPTION OF THE PREFERRED EMBODIMENT(S)

Figure 1:
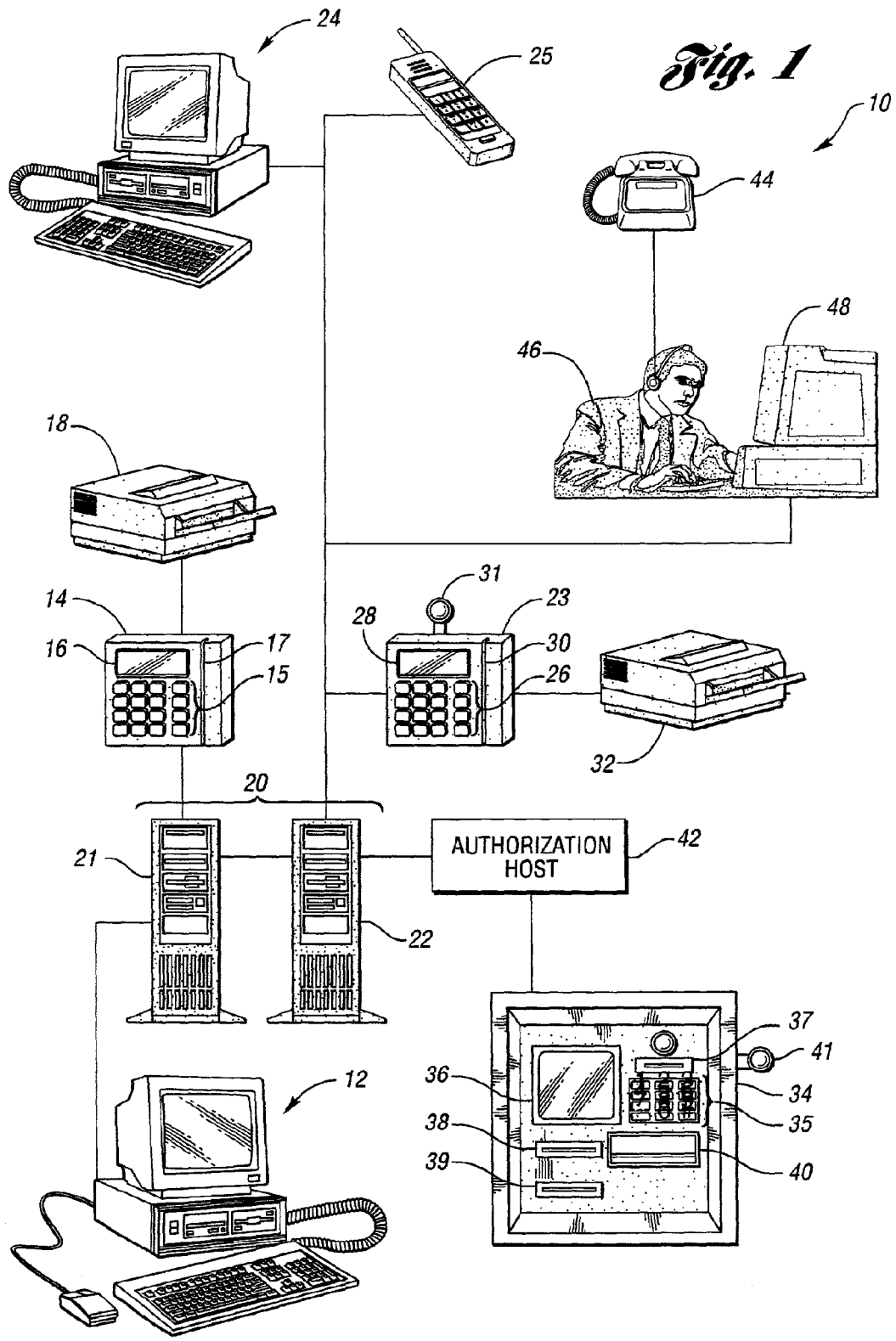
FIG. 1 is a schematic diagram of a system according to the invention for performing money transfer transactions.

FIG. 1 shows a system 10 according to the invention for performing electronic data transfers to effect money transfer transactions through a financial services institution. Generally, a money transfer transaction according to the invention may be divided into two distinct transactions, a money transfer send transaction, or send transaction, and a money transfer receive transaction, or receive transaction. Under the send transaction, a sender electronically sends or "wires" money to a recipient through the financial services institution. Under the receive transaction, the recipient receives the money through the financial services institution. Money transfer transactions may also be facilitated by an agent that may receive a commission for each transaction. Agent, as used herein, refers to a person that assists in one or more money transfer transactions through the financial services institution, but is not a direct employee of the financial services institution. Furthermore, both the sender and the recipient may be referred to as customers of the financial services institution and/or the agent.

The system 10 includes one or more send-transaction initiating devices, such as a personal computer 12 and/or an electronic terminal 14, for initiating the send transaction. The send transaction initiating devices 12, 14 may be located in any suitable area, such as an agent location, a sender's home or office, or a public place. The electronic terminal 14 may include a keypad 15, a display device 16 and a card reader 17. A printer 18 may also be provided in communication with the electronic terminal 14 for printing such things as receipts or other printed records. While the electronic terminal 14 may be any suitable electronic device such as an unattended automated teller machine (ATM), in the embodiment shown in FIG. 1, the electronic terminal 14 is an FDX-400® available from Western Union of Greenwood Village, Colo.

The send-transaction initiating devices 12, 14 are preferably in communication, either directly or indirectly, with a host computer system 20 of the financial services institution. For example, send-transaction initiating devices 12, 14 may be linked to the host computer system 20 via any suitable communication network such as a local area network, a wide area network, a dial-up network, the Internet, a wireless network or any combination thereof. While the host computer system 20 may include one or more host computers, in the embodiment shown in FIG. 1, the host computer system 20 includes a money transfer host 21 and a payout account host 22 in communication with the money transfer host 21. Furthermore, the send-transaction initiating devices 12, 14 may be used to provide transaction details to the host computer system 20, as explained below in detail.

The system 10 also includes one or more receive-transaction initiating devices or terminals, such as electronic terminal 23, a personal computer 24, or cellular telephone 25, that are used to initiate receive transactions, as explained below in greater detail. The electronic terminal 23 may include a keypad 26, a display device 28, a card reader 30 and an image scanner 31. A printer 32 may also be provided in communication with the electronic terminal 23 for printing such things as negotiable instruments, receipts and/or other printed records. While the electronic terminal may be any suitable electronic device, in the embodiment shown in FIG. 1, the electronic terminal 23 is also an FDX-400®.

Each receive-transaction initiating terminal 23, 24 and 25 may be linked to the host computer system 20 either directly or indirectly. For example, each receive-transaction initiating terminal 23, 24 and 25 may be linked to the host computer system 20 via any suitable communication network, such as a local area network, wide area network, a dial-up network, the Internet, a wireless network or any combination thereof.

In addition, the system 10 includes a receive-transaction fulfillment terminal or dispensing terminal, such as an ATM 34, that is used to dispense cash to the recipient. The ATM 34 may include a keypad 35, a display device 36, a card reader 37, a printer 38, a cash accepting device 39, a cash dispensing device 40, and an image scanner 41. The ATM 34 may be linked to the host computer system 20 via any suitable communication network such as a local area network, a wide area network, a dial-up network, the Internet, a wireless network or any combination thereof. Furthermore, such a communication network may be public (e.g., CIRRUS®, PLUS®, MAC®, etc.) or private so as to provide a barrier to entry.

The ATM 34 is also in communication with an authorization source or host 42 via a debit authorization network, such as MAC® or PLUS®, or via any other suitable communication network, such as a local area network, wide area network, a dial-up network, the Internet, a wireless network or any combination thereof. The authorization host 42 is in communication with the host computer system 20 via any suitable communication network. Alternatively, the authorization host 42 may be part of the host computer system 20.

Figure 2A:
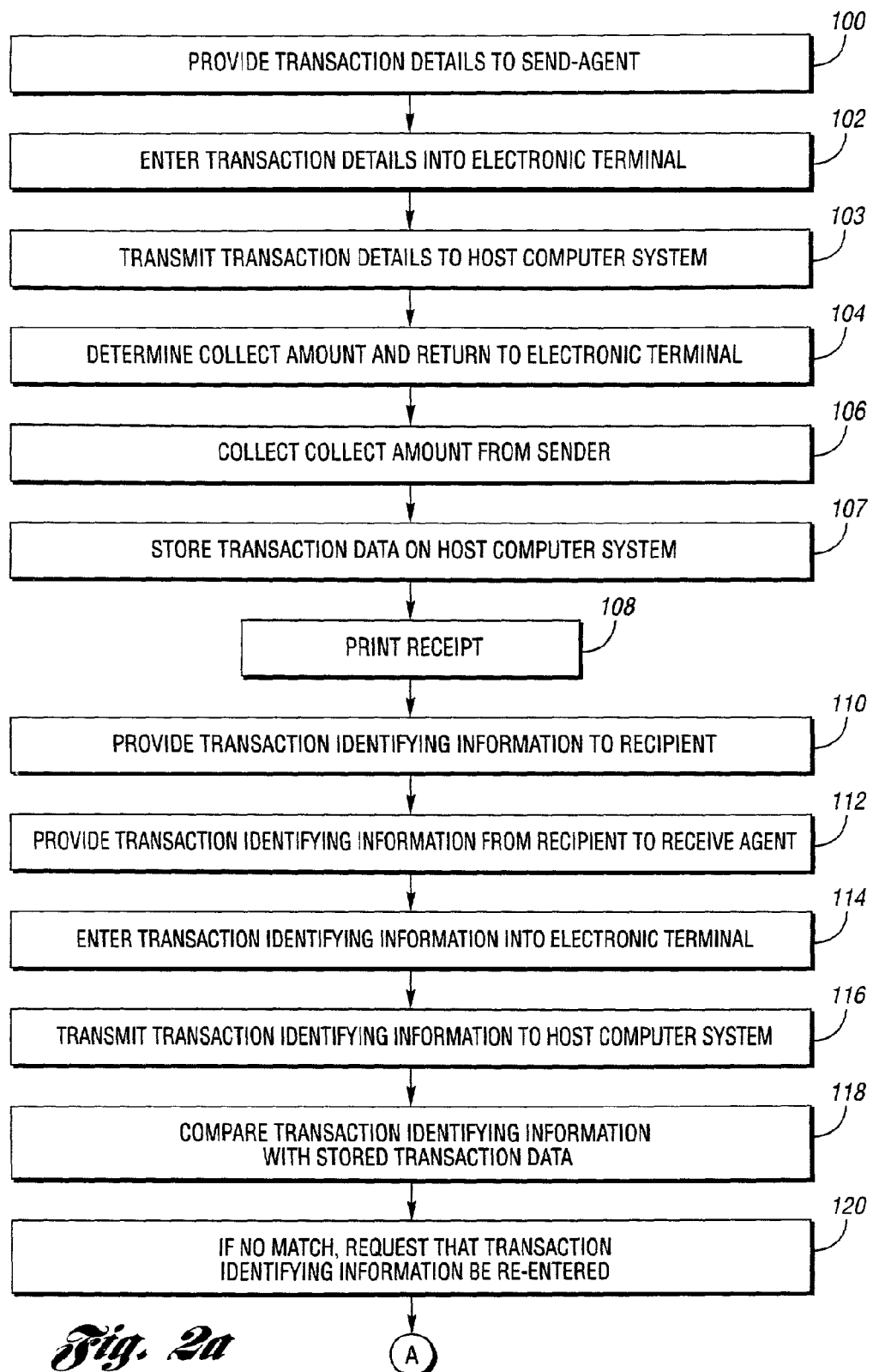
FIGS. 2 (2a and 2b) is a flowchart illustrating operation of a method according to the invention for performing money transfer transactions.

FIG. 2 is a flow chart illustrating operation of a method or system, such as the system 10, for performing money transfer transactions according to the invention. As will be appreciated by one of ordinary skill in the art, many of the steps in the flow chart, such as steps performed by the host computer system 20 or other electronic device, represent control logic or instructions that may be effected or implemented by hardware, software, or a combination of hardware and software.

As mentioned above, each money transfer transaction may be divided into a send transaction and a receive transaction. At step 100, the sender begins the send transaction by providing transaction details to a send-agent, who is an agent that assists in send transactions and may also assist in receive transactions. The transaction details may include, for example, the sender's name and address, recipient name, and/or a desired amount of money to be transferred to the recipient, which may be referred to as principal amount. At step 102, the send-agent enters the transaction details into the electronic terminal 14 using, for example, the keypad 15. At step 103, the electronic terminal 14 transmits the transaction details to the host computer system 20. If the principal amount to be sent is over a certain amount, then the terminal 14 or the host computer system 20 may also request supplemental information from the sender, such as driver's license number, social security number, date of birth, etc. in order to comply with institutional and/or regulatory requirements.

Next, at step 104, the host computer system 20 determines a collect amount, which represents the principal amount plus any service fee and taxes, if applicable, and returns the collect amount to the electronic terminal 14 for display on display device 16. The host computer system 20 may also return a code, such as a money transfer control number (MTCN), to the electronic terminal 14. The send-agent then collects the collect amount from the sender, as indicated at step 106. At step 107, transaction data, which may include some or all of the transaction details and/or the MTCN, is stored on the host computer system 20. At step 108, the printer 18 may then be used to automatically print a receipt, which may include the MTCN, thereby ending the send transaction.

Alternatively, the send transaction may be carried out in any suitable manner. For example, instead of using the electronic terminal 14, the send-agent may use a telephone (not shown) to contact an operator or other employee of the financial services institution, and to provide transaction details to the operator. The operator may then communicate with the host computer system 20 to carry out the send transaction. As another example, the sender may utilize the personal computer 12 to access the host computer system 20 over the Internet, and to provide transaction details to the host computer system 20. The sender may then pay the collect amount using a credit card. As another example, the send transaction may be carried out in multiple stages, such as disclosed in co-pending application Ser. No. 09/427,249, which is assigned to the assignee of the present invention and is hereby incorporated by reference in its entirety. Under this approach, send transactions may be "staged" using a computer, telephone, or by other means, and then "fulfilled" at an agent location. As yet another example, the send transaction may be carried out utilizing an ATM, such as disclosed in U.S. Pat. No. 5,650,604, which is hereby incorporated by reference in its entirety. Under any of the above approaches, transaction data, which may include some or all of the transaction details described above and/or an MTCN, may be stored on the host computer system 20.

At step 110, the receive transaction begins with the sender providing the recipient transaction identifying information, which may include some or all of the transaction details and/or the MTCN. During the receive transaction, the principal amount may be referred to as the receive amount. Next, at step 112, the recipient provides the transaction identifying information to a receive-agent, who is an agent that assists in receive transactions. It is to be understood that the receive-agent may also assist in send transactions. The recipient may also indicate to the receive-agent whether or not he or she desires to receive at least a portion of the receive amount from ATM 34.

At step 114, the receive-agent enters the transaction identifying information into the electronic terminal 23 using, for example, the keypad 26. The electronic terminal 23 then transmits the transaction identifying information to the host computer system 20, as indicated at step 116. Depending on the dollar value of the receive amount, or other characteristics of the receive transaction, the host computer system 20 may prompt the receive agent via the electronic terminal 23 to obtain identification, such as a driver's license, from the recipient. Next, the host computer system 20 compares the transaction identifying information with the stored transaction data, at step 118. If the transaction identifying information does not match the stored transaction data, then the host computer system 20 may request that the transaction identifying information be re-entered, as indicated at step 120. If, after one or more subsequent attempts, the transaction identifying information still does not match the stored transaction data, then the transaction may be terminated.

If, on the other hand, the transaction identifying information matches the stored transaction data, the host computer system 20 may then generate, assign, or otherwise provide an identification code and a confirmation code, as indicated at step 122. The identification code and the confirmation code may each be a numeric code that, together, may be used to uniquely identify the money transfer transaction. For example, the identification code and the confirmation code may each be a number. Alternatively, if the ATM 34 or other dispensing terminal is appropriately configured, the identification code and/or the confirmation code may comprise one or more alpha-numeric characters, symbols, sounds and/or images. For example, if the keypad 35 of the ATM 34 has letter characters as well as number characters, the identification code and/or the confirmation code may comprise alpha-numeric characters. As another example, if the ATM 34 or other dispensing terminal includes a scanner, such as image scanner 41, the identification code and/or the confirmation code may comprise one or more images and/or symbols, such as a bar code.

Next, at step 124, the identification code and confirmation code are transmitted or otherwise provided to the electronic terminal 23. The identification code and the confirmation code are also stored on the host computer system 20 at step 125. At step 126, the identification code and confirmation code are provided to the recipient. For example, the receive-agent may print the identification code and confirmation code on a receipt using the printer 32. At step 128, the host computer system 20 may load payout funds corresponding to some or all of the receive amount in a payout account maintained on the payout account host 22. For example, the money transfer host 21 may communicate with the payout account host 72 so as to load payout funds on the payout account host 22. Alternatively, payout funds corresponding to some or all of the received amount may be stored in a pending state on the host computer system 20. For example, payout funds may be stored in a pending state on a transaction database of the host computer system 20.

Alternatively, the receive transaction may be initiated in any suitable manner. For example, referring to FIG. 1, the recipient may use personal computer 24, telephone 25, or other electronic device, such as a personal digital assistant, to communicate with the host computer system 20 and provide the transaction identifying information to the host computer system 20. If the transaction identifying information matches the stored transaction data, then the host computer system 20 may provide the identification code and the confirmation code directly to the recipient, and may also load payout funds into the payout account.

As another example, the recipient may use telephone 44 to contact an employee of the financial services firm, such as a telephone operator or customer services representative (CSR) 46, so as to provide the transaction identifying information to the CSR 46. Depending on the dollar value of the receive amount, or other characteristics of the receive transaction, the CSR 46 may request that the recipient provide his or her driver's license number. The CSR 46 may then access the host computer system 20 using personal computer 48, for example, so as to compare the transaction identifying information with the stored transaction data. If the transaction identifying information matches the stored transaction data, the host computer system 20 may then generate or assign the identification code and the confirmation code, which are provided to the CSR 46 and stored on the host computer system 20. Furthermore, the host computer system 20 may load payout funds into the payout account or store payout funds in a pending state. Next, the CSR 46 may provide the identification code and confirmation code to the recipient.

As yet another example, the receive transaction may be initiated by using the ATM 34. Under this approach, the recipient may enter the transaction identifying information into the ATM 34 using the keypad 35. The ATM 34 then transmits the transaction identifying information to the host computer system 20 through the authorization host 42. Next, the host computer system 20 compares the transaction identifying information with the stored transaction data. If the transaction identifying information matches the stored transaction data, then the host computer system 20 may generate or assign the identification code and the confirmation code, which are transmitted or otherwise provided by the host computer system 20 to the ATM 34. The identification code and confirmation code are also stored on the host computer system 20. Furthermore, the host computer system may also load payout funds into the payout account. The ATM 34 then provides the codes to the recipient. For example, the codes may displayed on display device 36 and/or printed on a receipt using printer 38.

Once the recipient obtains the identification code and the confirmation code, the recipient may use these codes at the ATM 34 to obtain some or all of the receive amount. For example, in response to prompts by the ATM 34, the recipient may enter input corresponding to the identification code and confirmation code into the ATM 34 using keypad 35, at step 130. The recipient may also enter a desired withdrawal amount into the ATM 34 using the keypad 35, as indicated at step 132. The desired withdrawal amount may be a portion or all of the receive amount.

At step 134, the ATM 34 transmits the input and the desired withdrawal amount to authorization host 42, which transmits the input and the desired withdrawal amount to the host computer system 20. After receiving the input, the host computer system 20 compares the input to the stored identification code and confirmation code, as indicated at step 136. If the input does not match the stored codes, then the host computer system 20 may request that the input be re-entered, as indicated at step 138. If, after one or more subsequent attempts, the input still does not match the stored codes, then the transaction may be terminated.

If, on the other hand, the input matches the stored codes, then the host computer system 20 authorizes or otherwise allows the ATM 34 to dispense funds corresponding to the desired withdrawal amount to the recipient, at step 140. At step 142, if a payout account is being used, the host computer system 20 may also allow the payout account to exceed the receive amount or go negative by a predetermined, configurable amount, such as $5.00, so as to cover any transaction fee charged by the owner or operator of the ATM 34. After some period of time, such as at the end of each day, the host computer system 20 may then zero out the payout account, as well as any other payout accounts associated with other money transfer transactions, as indicated at step 144. Alternatively, the host computer system 20 may load an additional amount in the payout account, at the time the payout funds are loaded into the payout account or at any other time, so as to cover any transaction fee. For example, the host computer system 20 may automatically calculate a transaction fee at the time of a debit request, and then load the transaction fee into the payout account. Such a transaction fee may be determined, for example, by assuming an even, whole dollar desired withdrawal amount, and attributing any additional requested debit amount to the transaction fee. More specifically, if the ATM 34 transmits a debit request of $301.95, the host computer system 20 may assume that the desired withdrawal amount for the recipient is $300, and that the remaining $1.95 is the transaction fee.

As yet another alternative, if the payout funds are stored in a payout account or just stored in a pending state on the host computer system 20, the ATM 34 may debit or otherwise deduct a transaction fee, if any, from the payout funds, if authorized to do so by the recipient and/or the host computer system 20. As another alternative, the ATM 34 may request that the recipient enter an amount of money sufficient to cover the transaction fee into the cash accepting device 39.

Advantageously, if the recipient does not withdraw funds corresponding to the full amount of the payout funds, the host computer system 20 may be configured to allow the recipient to initiate a second or other subsequent withdrawal, using the same identification code and confirmation code, at the ATM 34 or a different ATM. In such a case, the host computer system 20 may include instructions for allowing the payout account to further exceed the amount of the payout funds, or go further negative, to cover any additional transaction fees for the additional dispensing transaction, or the recipient may be responsible for any additional transaction fees.

Because the method described above includes use of both an identification code and a confirmation code, the method may be used with ATM's that are configured to receive two separate numbers, such as disclosed in U.S. Pat. No. 5,650,604. Alternatively, the method according to the invention may involve generation and use of only one code. For example, the host computer system 20 may generate, assign or otherwise provide only the identification code or the confirmation code, and the recipient may use only the one code to obtain some or all of the receive amount.

As yet another alternative, the recipient may assign or otherwise provide the identification code, and the host computer system 20 may generate, assign or otherwise provide the confirmation code. For example, if the electronic terminal 23 includes image scanner 31 and the ATM 34, or other receiver transaction initiating device, includes an images scanner, such as image scanner 41, then the recipient may establish the identification code as an anatomical image, such as a finger print, retinal image or facial image. As another example, the recipient may establish the identification code as his or her telephone number, social security number, or any other number or code, such as a code that includes one or more alpha-numeric characters, symbols, sounds and/or images. The host computer system 20 may use the identification code and/or the receive amount as part of a key or algorithm to generate the confirmation code, or the host computer system 20 may randomly generate the confirmation code. Under this approach, if two recipients utilize the same identification code for two different transactions, the host computer system 20 will generate or assign a different confirmation code for each transaction so that the transactions can be uniquely identified.

Under the invention, actions by the recipient, not the sender, are preferably what trigger generation or establishment of the identification code and/or confirmation code. Furthermore, the identification code and/or confirmation code are issued directly to the recipient, rather than being issued to the sender. As a result, no matter how the send transaction is carried out, the recipient may cause the receive transaction to be carried out using the ATM 34 or other suitable dispensing terminal.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer implemented method for performing a money transfer receive transaction involving a desired amount of money to be transferred from a sender to a recipient, the method comprising:

receiving transaction identifying information provided by the recipient, wherein the transaction identifying information is not operable at a dispensing terminal;

comparing the transaction identifying information with transaction data stored on a host computer system;

providing a confirmation code or an identification code, to be issued to the recipient, if the transaction identifying information matches the transaction data stored on the host computer system;

storing the confirmation code or identification code on the host computer system;

receiving at the host computer system input corresponding to the confirmation code or identification code from the dispensing terminal in communication with the host computer system;

comparing the input to the confirmation code or identification code stored on the host computer system; and allowing funds, corresponding to at least a portion of the desired amount of money, to be dispensed by the dispensing terminal if the input matches the confirmation code or identification code stored on the host computer system.

2. The method of claim 1, wherein the confirmation code or identification code comprises a sound or a series of sounds.

3. The method of claim 1, wherein the confirmation code or identification code comprises a bar code.

4. The method of claim 1, wherein the confirmation code or identification code comprises at least one of the following: an anatomical image, a finger print, a retinal image, or a facial image.

5. The method of claim 1, further comprising:
if the input does not match the confirmation code or identification code stored on the host computer system, requesting the transaction identifying information to be re-entered.

6. The method of claim 5, further comprising:
if after more than one attempts to match the confirmation code or identification code are not successful, terminating the transaction.

7. The method of claim 1, wherein providing a confirmation code or identification code includes providing, by the host computer system, the confirmation code or identification code to a receive-transactions initiating device comprising a personal digital assistant or processor-based device in communication with the host computer system.

8. The method of claim 1 further comprising:
providing the confirmation code or identification code to the recipient if the transaction identifying information matches the transaction data stored on the host computer system;

storing the confirmation code or identification code on the host computer system;

receiving at the host computer system additional input corresponding to the confirmation code or identification code from the dispensing terminal;

comparing the additional input to the confirmation code or identification code stored on the host computer system; and wherein the step of allowing funds, corresponding to at least a portion of the desired amount of money, to be dispensed by the dispensing terminal includes allowing the funds to be dispensed if the additional input matches the confirmation code or identification code stored on the host computer system.

9. The method of claim 8, wherein the confirmation code or identification code comprises a sound or a series of sounds.

10. The method of claim 8, wherein the confirmation code or identification code comprises a bar code.

11. The method of claim 8, wherein the confirmation code or identification code comprises at least one of the following: an anatomical image, a finger print, a retinal image, or a facial image.

12. The method of claim 1, wherein allowing funds, corresponding to at least a portion of the desired amount of money, to be dispensed by the dispensing terminal if the input matches the confirmation code or identification code stored on the host computer system comprises allowing funds, corresponding to at least a portion of the desired amount of money, to be dispensed by the dispensing terminal if the input matches the confirmation code or identification code stored on the host computer system, and wherein the method further comprises receiving at the host computer system additional input corresponding to the confirmation code or identification code from an additional dispensing terminal in communication with the host computer system, comparing the additional input to the confirmation code or identification code stored on the host computer system, and allowing additional funds, corresponding to a second portion of the desired amount of money, to be dispensed by the additional dispensing terminal if the additional input matches the confirmation code or identification code stored on the host computer system.

13. A computer implemented method for performing a money transfer transaction, the method comprising:

storing transaction data on a host computer system, wherein the transaction data includes a desired amount of money to be electronically transferred from a sender to a recipient;

receiving at the host computer system transaction identifying information from a receive-transaction initiating terminal in communication with the host computer system, wherein the transaction identifying information is provided by the recipient and the transaction identifying information includes a first code provided by the sender to the recipient;

comparing the transaction identifying information with the transaction data stored on the host computer system;

providing, by the host computer system, an identification code or a confirmation code to the receive-transaction initiating terminal, for issuance to the recipient, if the transaction identifying information matches the transaction data stored on the host computer system;

storing the identification code or the confirmation code on the host computer system;

receiving at the host computer system input corresponding to the identification code or the confirmation code from a dispensing terminal in communication with the host computer system;

comparing the input to the identification code or the confirmation code stored on the host computer system; and authorizing funds corresponding to at least a portion of the desired amount of money to be dispensed by the dispensing terminal if the input matches the identification code or the confirmation code stored on the host computer system.

14. The method of claim 13, further comprising requesting the recipient enter an amount of money via the dispensing terminal sufficient to cover a transaction fee.

15. The method of claim 13, further comprising receiving at the host computer system the identification code provided by the recipient, and generating the confirmation code by the host computer system based on the identification code or a receive amount as part of a key or algorithm.

16. The method of claim 13, further comprising receiving at the host computer system the confirmation code provided by the recipient, and generating the identification code by the host computer system based on the confirmation code or a receive amount as part of a key or algorithm.

17. The method of claim 13, wherein the identification code or confirmation code comprises a randomly generated portion.

18. A computer implemented method for performing a money transfer receive transaction involving a desired amount of money to be transferred from a sender to a recipient, the method comprising:

receiving transaction identifying information provided by the recipient;

comparing the transaction identifying information with transaction data stored on a host computer system;

providing a confirmation code or identification code, to be issued to the recipient, if the transaction identifying information matches the transaction data stored on the host computer system;

storing the confirmation code or identification code on the host computer system;

loading payout funds into a payout account associated with the confirmation code or identification code in response to the transaction identifying information matching the transaction data;

receiving at the host computer system input corresponding to the confirmation code or identification code from a dispensing terminal in communication with the host computer system;

comparing the input to the confirmation code stored on the host computer system; and allowing funds, corresponding to at least a portion of the desired amount of money, to be dispensed by the dispensing terminal from the payout account if the input matches the confirmation code or identification code stored on the host computer system.

19. The method of claim 18, wherein the confirmation code or identification code is generated by the host.

20. The method of claim 18, wherein the confirmation code or identification code comprises a sound or a series of sounds.

21. The method of claim 18, wherein the confirmation code or identification code comprises a bar code.

22. The method of claim 18, wherein the confirmation code or identification code comprises at least one of the following: an anatomical image, a finger print, a retinal image, or a facial image.

23. The method of claim 18, further comprising:
if the input does not match the confirmation code or identification code stored on the host computer system, requesting the transaction identifying information to be re-entered.

24. The method of claim 18, further comprising:
if after more than one attempts to match the confirmation code or identification code are not successful, terminating the transaction.

25. The method of claim 18, wherein providing a confirmation code or identification code includes providing, by the host computer system, the confirmation code or identification code to a receive-transactions initiating device comprising a personal digital assistant or processor-based device in communication with the host computer system.

\* \* \* \* \*